(12) United States Patent
Denkewicz, Jr. et al.

(10) Patent No.: US 6,312,604 B1
(45) Date of Patent: Nov. 6, 2001

(54) LANTHANIDE HALIDE WATER TREATMENT COMPOSITIONS AND METHODS

(75) Inventors: Raymond P. Denkewicz, Jr., Warwick, RI (US); Ernest E. Senderov, Conshohocken, PA (US); Joseph W. Grenier, North Providence; Therese Souza, Cranston, both of RI (US)

(73) Assignee: Zodiac Pool Care, Inc., Pompano Beach, FL (US)

( * ) Notice: Subject to any disclaimer, the term of this patent is extended or adjusted under 35 U.S.C. 154(b) by 0 days.

(21) Appl. No.: 09/178,220

(22) Filed: Oct. 23, 1998

(51) Int. Cl.$^7$ ............... B01D 21/01; C02F 1/68; B01J 20/02

(52) U.S. Cl. ............ 210/728; 210/753; 210/754; 210/196; 210/169; 523/122; 502/303; 502/412

(58) Field of Search .................. 210/728, 753, 210/754, 767, 776, 807, 196, 169; 523/122; 502/303, 412

(56) References Cited

U.S. PATENT DOCUMENTS

| | | | |
|---|---|---|---|
| D. 391,338 | * | 2/1998 | King . |
| D. 391,624 | * | 3/1998 | King . |
| 3,617,569 | * | 11/1971 | Daniels ................. 210/53 |
| 3,956,118 | * | 5/1976 | Kleber ................. 210/45 |
| 4,080,290 | * | 3/1978 | Klantschi et al. ......... 210/37 R |
| 4,756,993 | * | 7/1988 | Kitatani ................. 430/69 |
| 5,041,487 | * | 8/1991 | Kissel ................. 524/377 |
| 5,248,438 | * | 9/1993 | Perez ................. 210/701 |
| 5,342,540 | | 8/1994 | Perez . |
| 5,683,953 | * | 11/1997 | Mills ................. 210/724 |
| 5,897,784 | * | 11/1999 | Mills ................. 210/705 |
| 6,156,298 | * | 12/2000 | Karlen et al. . |

FOREIGN PATENT DOCUMENTS

| | | |
|---|---|---|
| 534337 | 1/1984 | (AU) . |
| 548852 | 1/1986 | (AU) . |
| WO 94/19286 | 9/1994 | (WO) . |
| WO 98/42626 | 10/1998 | (WO) . |

OTHER PUBLICATIONS

The Nalco Water Handbook, 2nd edn., McGraw–Hill, p. 8.12–8.13, 1988.*

Chu, "The influence of the mineral composition of the medium on the growth of planktonic algae. I. Methods and culture media," *J. Ecol.*, 30:284–325 (1942) (Edited for the British Ecological Society by W. H. Pearsall).

Chu, "The influence of the mineral composition of the medium on the growth of planktonic algae. II. The influence of the concentration of inorganic nitrogen and phosphate phosphorus," *J. Ecol.*, 31:109–148 (1943) (Edited for the British Ecological Society by W. H. Pearsall).

Firsching and Brune, "Solubility Products of the Trivalent Rare–Earth Phosphates," *J. Chem. Eng. Data,* 36:93–95 (1991).

Firsching and Mohammadzadel, "Solubility Products of the Rare–Earth Carbonates," *J. Chem. Eng. Data,* 31:40–42 (1986).

Fleming, "Water–Treatment Products and Processes," *Water Treatment*, 263–272 (undated).

Kuhl, "Inorganic Phosphorus Uptake and Metabolism," *Physiology & Biochemistry of Algae,* Academic Press, New York, Chapter 12:211–229 (1962).

Melnyk, et al., "Lanthanum Precipitation: An Alternative Method for Removing Phosphates from Wastewater," *11th Rare Earth Res. Conf. Proc.,* Traverse City, Michigan 1:4–13 (Oct. 7–10, 1974).

Mills, et al., "A new synthetic material for the removal of phosphate from water," (Copyright D. J. Mills Aug. 5, 1993).

Olem and Fleck, Editors, "Problem I: Nuisance Algae," *Lake and Reservoir Restoration Guidance Manual,* 2nd Edition, 121–122, 133–134 (1990).

Recht and Ghassemi, "Phosphate Removal from Wastewaters Using Lanthanum Precipitation," *Water Pollution Control Research Series,* U.S. Department of the Interior, Federal Water Quality Administration, pp. ii–v, 1–45 (17010EFX 04/70) (1970).

Sawyer, "Fertilization of lakes by agricultural and urban drainage," *J. N.E. Water Works Assn.,* 61:1925 (1947) (Published by The New England Water Works Association, Boston, Mass).

Urano and Tachikawa, "Process Development for Removal and Recovery of Phosphorus from Wastewater by a New Adsorbent. 1. Preparation Method and Adsorption Capability of a New Adsorbent," *Ind. Eng. Chem. Res.,* 30:1893–1896 (1991).

Wasserlauf, "Regeneration of Lanthanum Following Precipitation of Phosphates from Waste–Waters," A Major Study Report Submitted to the School of Graduate Studies in Partial Fulfillment of the Requirements for the Degree Master of Engineering, McMaster University (Mar. 1973) Abstract.

\* cited by examiner

*Primary Examiner*—Chester T. Barry
(74) *Attorney, Agent, or Firm*—Bruce D. Gray; Dean W. Russell; Kirkpatrick Stockton LLP

(57) ABSTRACT

The present invention relates to compositions and methods for treating water to reduce the phosphate level thereof and control the growth therein of algae and other microorganisms by treating the water with an effective amount of a composition containing a lanthanide halide.

33 Claims, No Drawings

LANTHANIDE HALIDE WATER TREATMENT COMPOSITIONS AND METHODS

BACKGROUND OF THE INVENTION

1. Field of the Invention

The present invention relates to compositions and methods for treating water, in particular recirculated water, such as that found in pools, hot tubs, spas, and process equipment, such as cooling towers, to control the growth of algae by contacting the water with compositions containing lanthanide halide salts.

2. Description of the Related Art

Phosphorus compounds, and in particular phosphates, are nutrients required for all living protoplasm, which contains about 2% phosphorus on a dry basis. Insufficient phosphorus can thus limit the growth and development of aquatic organisms. Phosphate compounds find their way into water via various methods. For example, phosphate is used as a nutrient in biological waste treatment processes, as industrial water softening chemicals, as complexing agents in boiler waters, as threshold treatment agents, and as builders in detergent compositions. They can also be introduced into water through animal waste products, such as urine and sweat, as well as through the breakdown of plant material or water treatment chemicals added to the water.

The presence of significant levels of phosphate compounds in water can lead to eutrophication—the phosphates provide nutrients for the development and growth of undesirable algae and other microorganisms. In streams, lakes, and ponds, this can result in oxygen depletion and destruction of valuable aquatic plant and animal life. In recreational bodies of water, such as in pools, hot tubs, and spas, the growth of algae is unsightly and can clog filters and pumps, create health concerns, and effectively make the pool, hot tub, or spa unusable. In process equipment using recirculated water, such as in cooling towers, the uncontrolled growth of algae and other microorganisms can decrease efficiency of heat transfer surfaces, increase load on pumps and other equipment, and create health concerns about the transfer of the microorganisms between heat transfer fluids, e.g., from the cooling water to the cooled air.

One way to control the growth of algae and other microorganisms in water is to control the amount of nutrients present. For instance, control of the level of phosphate compounds by effectively removing excess phosphates from the water can have a significant effect on algae and microorganism control. In some cases, control of the phosphorus level in the water may be the only effective way to control the development of algae and other microorganisms, short of adding biocides. For example, there is some evidence the blue-green algae are capable of satisfying their demand for nitrogen-containing nutrients by removing atmospheric nitrogen from the air. Thus, control of nitrogen nutrients in the water is unlikely to provide adequate control of these organisms, leading to the need for control of phosphate compounds instead.

Algal growth leads first to a coating of slime on the surfaces containing the water, such as on the walls and bottom of a swimming pool, hot tub, or spa, then to an unpleasant green discoloration of the water, and finally to the proliferation of other microorganisms and aquatic species, some of which may be pathogenic for humans. Methods for controlling algae include physically scrubbing the surfaces where algae grow and then pumping the water through a filter to remove the dislodged algae from the water. Alternatively, chemical toxins or biocides are added to the water to kill the algae and other microorganisms. In many cases, pool, hot tub, or spa owners use some combination of these treatments. However, the use of toxins or biocides typically causes some concern with respect to how these materials will affect the health of those using the pool, tub, or spa.

The difficulty of maintaining suitably clean, algae-free water in a pool, hot tub, or spa is generally considered due to increase with the age and usage of the pool, tub, or spa The water of heavily used pools tends to develop an unpleasant odor and to irritate the eyes and skin of users, due at least in part to the development of high levels of chloramines in the pools, a result of the use of large quantities of chlorine-containing compounds as biocides. Extended "super-chlorination" can be used to remedy this problem, but this renders the pool unusable for a substantial time, and is only a temporary solution, since the chloramine and algae soon return.

Accordingly, there is a need in the area of treating water, in particular pool, hot tub, and spa water, as well as process water, such as water in cooling towers, for a composition and technique that controls the formation of algae without the need for mechanical scrubbing or for toxic biocides. In particular, there is a need for compositions and methods that control the level of phosphates in the water, thereby limiting the nutrient available for the growth of algae and other microorganisms. Phosphate levels in this type of water can range from a few parts per billion (ppb) to over 1000 ppb. Algae development typically becomes supportable at phosphate levels of about 20 ppb, and becomes very objectionable at levels above 400 ppb.

One approach to control of the phosphate concentration in water has been to add to the water compounds that are capable of precipitating all or most of the phosphate as an insoluble salt. These systems are somewhat complex due to the nature of the various phosphate compounds that may be present, such as orthophosphate (present as $H_3PO_4$, $H_2PO_4^-$, $HPO_4^{2-}$, $PO_4^{3-}$, $HPO_4^{2-}$, and complexes thereof), pyrophosphate (present as $H_4P_2O_7$, $H_3P_2O_7^-$, $H_2P_2O_7^{2-}$, $HP_2O_7^{3-}$, $P_2O_7^{4-}$, and complexes thereof), tripolyphosphate (present as $H_3P_3O_{10}^{2-}$, $H_2P_3O_{10}^{3-}$, $HP_3O_{10}^{4-}$, $P_3O_{10}^{5-}$, and complexes thereof), trimetaphosphate (present as $HP_3O_9^{2-}$ and $P_3O_9^{3-}$) and organic phosphates (such as phospholipids, sugar phosphates, nucleotides, phosphoamides, etc.). Additional complexity is introduced by the acid-base equilibria of phosphoric acid. This complexity makes difficult prediction of the results obtained by treating phosphate-containing water with salts to form insoluble precipitates.

For example, attempts to use calcium salts, such as lime, to precipitate phosphate as hydroxyapatite are not as successful as an analysis of solubility product constants might lead one to believe, at least in part due to nucleation and crystallinity considerations. Moreover, the use of calcium, iron, and aluminum salts to precipitate phosphate is typically restricted to a fairly narrow pH range (in the acidic range, below the recommended pH for pool water for iron and aluminum, and in the basic range above the recommended pH for calcium), requires the addition of large quantities of salts, and produces large quantities of flocs that are unsightly and tend to clog filters. These techniques are not particularly effective at reducing the phosphate level below 50 ppb, leaving sufficient phosphate in the water to support continued algal growth, and are difficult to use in pool water due to the buffering compounds typically present in pool water to maintain at the recommended pH.

Lanthanum nitrate has recently been suggested for the removal of phosphate compounds from pure aqueous phosphate solutions and from activated sludge-treated wastewater by precipitation. However, this treatment would not be particularly suitable for use in swimming pools, hot tubs, or spas, since the reaction between the lanthanum salt and polyphosphates can fail to form settlable flocs outside of the optimum pH region, requiring the pool owner to either precisely control the pH of the pool water, or to live with turbidity from the suspended lanthanum phosphate salts. In addition, the pH for maximum phosphate removal using a 1:1 lanthanum: phosphate ratio is well below the pH of most pools, and a substantial amount of residual turbidity is observed in the pH range of most pool water. Thus, this technique is not suitable for a constant, steady treatment of the water to remove phosphate over time.

Lanthanum carbonate has also recently been suggested to treat pool water to reduce algae and orthophosphate levels in combination with aluminum chloride. However, this salt also causes a substantial amount of pool turbidity, which is undesirable. The aluminum chloride also contributes substantially to the level of removal achieved. In addition, the efficiency with which lanthanum carbonate removes phosphate appears to be enhanced by the presence of high concentrations of chloride ion, and appears to decrease when lanthanum carbonate is used in fresh water pools or other bodies of fresh water. It has been suggested that lanthanum carbonate removes orthophosphate from water via an ion exchange mechanism. However, an ion exchange mechanism is not suitable for removal of polyphosphates, which can form a significant quantity of phosphate in the water.

Accordingly, there remains a need in the art for a water treatment composition and method for reducing algal growth and removing phosphate from the water consistently over time, without the need for mechanical, biocidal chemical, or super-chlorination treatment, and which does not leave the pool water turbid.

SUMMARY OF THE INVENTION

The present invention relates to water treatment compositions comprising: a lanthanide halide salt. In a particular embodiment, the present invention relates to a water treatment composition, comprising:

(a) a lanthanide halide salt; and (b) a high molecular weight polymer.

In a more particular embodiment, the composition may further comprise:

(c) a binder.

The present invention also relates to methods for reducing the concentration of phosphates in water by contacting the water with an effective amount of the water treatment composition of the invention for a time sufficient to decrease the concentration of phosphates in the contacted water.

The present invention also relates to methods of controlling algal growth in bodies of water, by contacting the water with an effective amount of the water treatment composition of the invention for a time sufficient to decrease the concentration of phosphates in the contacted water.

When the composition of the present invention is placed in the recirculation system of a body of water, it gradually releases lanthanum and/or lanthanide ions into the water, which react with phosphate compounds, such as orthophosphate and condensed phosphates, forming water-insoluble lanthanum phosphate compounds. The high molecular weight polymer helps to flocculate this precipitate, and facilitates the removal of the insoluble materials by a water filtration system, as well as helping to prevent the insolubles from causing turbidity. The composition and method of the present invention permit removal of phosphate at $PO_4$:La ratios greater than 1:1, which is better than would be expected based upon reaction stoichiometry. Moreover, good results are obtained at pH ranges that are typically found in pools, hot tubs, and spas. Use of a binder allows the composition to be utilized in a solid, monolithic form.

The present invention is thus advantageous with respect to decreased turbidity and increased phosphate removal efficiency. This leads to advantages in methods for controlling algal growth in bodies of water, in particular recirculated water such as is found in pools, hot tubs, spas, and cooling equipment The present invention can be more clearly understood by reference to the following description of specific embodiments thereof, which is not intended to limit the scope of the invention or of the appended claims.

DESCRIPTION OF SPECIFIC EMBODIMENTS OF THE INVENTION

In a particular embodiment of the composition of the present invention, the lanthanide halide is a lanthanide chloride. The lanthanide chlorides suitable for the present invention may be in the form of lanthanum chloride per se ($LaCl_3$). However, mixtures of chloride salts of lanthanide cations having an atomic number between 57 and 71 can also be used. More particularly, the lanthanide chloride can be a mixture of two or more of the chlorides of lanthanum, neodymium, cerium, and/or praseodymium. In embodiments where a mixture of lanthanide chlorides is used, the mixture can typically contain, based upon the total lanthanide halides, from about 40 wt % to about 70 wt % lanthanum chloride, about 10 wt % to about 30 wt % neodymium chloride, about 0 wt % to about 30 wt % cerium chloride, and about 0 wt % to about 10 wt % praseodymium chloride. The mixture can be used as an aqueous solution, or as a dried product, e.g., a flake or powder. An example of a suitable solution is Product 5240, Molycorp, Fairfield N.J. This solution contains approximately 46% lanthanide (calculated as lanthanide oxide equivalent based on the dry composition), and contains lanthanide halides in amounts of 26.5 wt % lanthanum chloride (calculated as wt % $La_2O_3$ of the dry composition), 6.9 wt % cerium chloride (calculated as wt % $CeO_2$ of the dry composition), 3.4 wt % praseodymium chloride (calculated as wt % $Pr_6O_{11}$ of the dry composition), and 9.2 wt % neodymium chloride (calculated as wt % $Nd_2O_3$ of the dry composition). The lanthanide chloride concentration of this solution, calculated as hexahydrate salt, is about 55 to 60 wt %, and the solution has a pH of at least 3.5.

In more particular embodiments of the invention, the high molecular weight polymer is selected from the group consisting of poly(acrylamide-co-acrylic acid), chitosan, polyacrylamide, poly(acrylic acid), and polyvinyl alcohol. An example of a suitable high molecular weight polymer is a poly(acrylamide-co-acrylic acid) available from Aldrich, Milwaukee, Wis., as product number 43,495-7, having formula $[—CH_2CH(CONH_2)—]_x[—CH_2CHCO_2H)—]_y$ an average molecular weight $M_w$ of around 15,000,000, an adsorbed water content of around 10–15 wt %, and a pH of around 5–7.

In yet another more particular embodiment of the invention, the binder is selected from the group consisting of diatomaceous earth, zeolites, alumina, silica, and silicates. An example of a suitable binder is Celatom Diatomite (diatomaceous earth), available from Eagle-Picher Minerals, Reno, Nev.

The composition of the present invention may have several different physical forms, including an aqueous slurry or paste, a solid or monolithic mass, dry pressed pellets, or a powder. When an aqueous slurry or paste is desired, a binder is not necessary.

In a particular embodiment of the invention, the lanthanide halide salt is present in an amount ranging from about 50 wt % to about 80 wt %, based upon the total solids in the composition, more particularly from about 55 wt % to about 75 wt %, even more particularly about 65 wt %. In another particular embodiment of the invention, the high molecular weight polymer is present in an amount ranging from about 8 wt % to about 20 wt %, based upon the total solids in the composition, more particularly from about 10 wt % to about 16 wt %, even more particularly about 13 wt %. It is desirable to have a ratio of high molecular weight polymer to lanthanide ion in the composition in the range 0.2:1 to 1:1. In another particular embodiment of the invention, the binder is present in an amount ranging from about 20 wt % to about 40 wt %, based upon the total solids in the composition, more particularly from about 25 wt % to about 35 wt %, even more particularly about 33 wt %.

In yet another particular embodiment of the present invention, wherein the lanthanide halide salt is lanthanum chloride per se, the composition comprises:

(a) 50 wt % to 60 wt % lanthanum chloride, calculated as $LaCl_3 \cdot 6H_2O$;

(b) 11 wt % to 15 wt % poly(acrylamide-co-acrylic acid); and (c) 30 wt % to 35 wt % diatomaceous earth; even more particularly:

(a) about 55 wt % lanthanum chloride, calculated as $LaCl_3 \cdot 6H_2O$;

(b) about 13 wt % poly(acrylamide-co-acrylic acid); and (c) about 32 wt % diatomaceous earth.

The composition of the present invention can be made by mixing a solution of lanthanide halide, e.g., lanthanide chloride, with a high molecular weight polymer, and binding agent, e.g., diatomaceous earth, to form a paste. The paste can then be dried at moderate temperatures (e.g., about 200–300 ° F.) for a short time (about 2-4 hours), to provide a solid material. If a solid composition is not desired, the binder can be excluded, and the lanthanide halide and high molecular weight polymer can be formed into a paste or slurry.

PREPARATION EXAMPLES

Example 1

500 g of a 46 wt % lanthanide chloride solution (Product 5240, Molycorp, Fairfield, N.J.), 50 g of poly(acrylamide-co-acrylic acid) having a molecular weight of approximately 15,000,000 (available from Aldrich, Milwaukee, Wis.), and 140 g diatomaceous earth (Celatom Diatomite, Eagle Picher Minerals, Reno, Nev.) were mechanically mixed. The resulting paste was placed in a mold and dried at 300° F. for 4 hours. The result was a rigid solid. The paste lost approximately 43% of its weight upon drying.

Example 2

270 g of a 46 wt % lanthanide chloride solution (Product 5240, Molycorp, Fairfield, N.J.), 27 g of poly(acrylamide-co-acrylic acid) having a molecular weight of approximately 15,000,000 (available from Aldrich, Milwaukee, Wis.), and 200 g of zeolite (clinoptilolite type) were mechanically mixed. The resulting paste was placed in a mold and dried at 300° F. for 4 hours. The result was a rigid solid. The paste lost approximately 40% of its weight upon drying.

As described above, the present invention also relates to methods of using these compositions to reduce the phosphate concentration in water, and to control the growth of algae and other microorganisms. In a more particular embodiment of this aspect of the invention, the water is recirculated, e.g., in a pool, hot tub, spa, or cooling apparatus, such as a cooling tower. The contacting of the water with the composition can be combined with conventional filtration techniques used to treat recirculated water, such as that in pools, hot tubs, or spas. The contacting can be carried out just after the filtration, e.g., by supplying the composition on the post filtration side of the water flow. This can allow for better mixing with the water, and results in a more efficient reaction between the lanthanum ions and the phosphate compounds. Filtering of the water will occur again as the water is recirculated, and during the subsequent filtrations, the flocs will be removed from the water.

One method for contacting the composition with water is to place it into a flow-through vessel, e.g., a vessel that is plumbed in line in the water filtration line. As indicated above, this placement can be made either upstream or downstream of the filter itself Alternatively, the composition can be placed into a basket or other floating holder, and placed in the water, where it can either float free or be confined in a filter trap. If the composition is in the form of a paste or slurry, instead of a monolithic solid, it can be placed into a container that allows water to diffuse in and contact the slurry, and then escape the container.

The amount of composition introduced into the water may depend to some extent on the phosphate concentration of the water. Typically sufficient amount of the composition is introduced into the water to provide weight ratios of lanthanum ion to phosphorus in the range of about 0.1 to about 10, more particularly about 0.5 to about 5. Alternatively, the composition may be provided as a product suitable to provide sufficient lanthanum ion concentration for most pools under most conditions, eliminating the need for measurement of the phosphate level in the pool. For example, the composition can be introduced into water in amounts that produce a level of about 10 ppm of lanthanum ion in the water of typical pools having average phosphate levels. Exemplary levels of addition are provided by the water treatment examples below.

As indicated above, the use of the composition of the present invention consistently provides an extremely high removal efficiency. The stoichiometry of the formation of $La(PO_4)$ would lead to the prediction of a theoretical limit for phosphate removal of 1 mole of phosphate removed for each mole of lanthanum ion added to the solution. The product of the present invention consistently provides better performance than suggested by this theoretical limit. While not wishing to be bound by any theory, it is believed that this increase in performance is at least in part due to the formation of a mixture of acid salts in the form $LaPO_4$, $LaHP_2O_7$, $La_{0.33}H_2PO_4$ (which may be written as $LaH_6(PO_4)_3$ and $LnCl_3$. This provides a significant advantage over $Ln_2(CO_3)_3$ based treatments.

WATER TREATMENT EXAMPLES

Examples 3–7

Samples of water were taken from residential swimming pools and analyzed for total phosphorus content. Analysis was performed by Inductively Coupled Plasma (ICP) spectroscopy. Various quantities of material made according to Example 1 were placed in a flow-through vessel (plumbed in line after the filter) on each pool. The circulation systems on the pools were run 10–12 hours/day and the water checked daily for signs of turbidity. After 21 days, a water sample from each pool was tested for total phosphorus content. The results own in Table 1.

TABLE 1

| Ex. | Pool Size (gal.) | Amount of Solid Material (g) | Phosphorus Level Prior to Treatment (as ppm PO$_4$) | Phosphorus Level After After Treatment (as ppm PO$_4$) | Phosphorus Removal Capacity (as g PO$_4$ per product) | Turbidity |
|---|---|---|---|---|---|---|
| 3 | 20,000 | 168 | 4.22 | 3.44 | 0.35 | None |
| 4 | 20,000 | 168 | 0.166 | 0.033 | 0.06 | None |
| 5 | 7,500 | 112 | 0.67 | 0.28 | 0.10 | None |
| 6 | 20,000 | 168 | 5.86 | 4.18 | 0.76 | None |
| 7 | 6,000 | 57 | 1.65 | 1.1 | 0.22 | None |

Examples 8–9

Two beakers were filled with 1 L each of a sodium tripolyphosphate solution (340 mg NaHCO$_3$, Aldrich and 84 mg of sodium tripolyphosphate, Aldrich in 2 L of deionized water). In Example 8, 125 mg of dry lanthanum chloride hexahydrate (Aldrich) was added to one of the beakers. In Example 9, 72 mg of dry lanthanum carbonate (Molycorp) was added to the other beaker. These additions resulted in an equimolar concentration of lanthanum in each of the two beakers. Both beakers were stirred moderately. Samples were removed from each beaker after four days of mixing, and filtered through a 0.45 µm PTFE filter and analyzed for total phosphorus by ICP spectroscopy. The results are given in Table 2.

TABLE 2

| Time (days) | Example 8 Total Phosphorus (ppb) | Example 9 Total Phosphorus (ppb) |
|---|---|---|
| 0 | 475 | 458 |
| 4 | 72.5 | 488 |

The results show that lanthanum chloride effectively precipitates polyphosphates, while lanthanum carbonate does not.

Examples 10–11

Two beakers were filled with 1 L each of an orthophosphate solution (340 mg NaHCO$_3$, Aldrich and 10 mL of a 1000 ppm PO$_4^{3-}$ standard solution (SPEX) in 2 L of deionized water). In Example 10, 8.5 mg of dry lanthanum chloride hexahydrate (Aldrich) was added to one of the beakers. In Example 11, 5.5 mg of dry lanthanum carbonate (Molycorp) was added to the other beaker. These additions resulted in equimolar concentrations of lanthanum in each of the two beakers. Both beakers were stirred moderately. Samples were removed from each beaker after 4 days of mixing, filtered through a 0.45 µm PTFE filter and analyzed for orthophosphate content by ion chromatography. The results are given in Table 3.

TABLE 3

| Time (days) | Example 10 Orthophosphate (ppm) | Example 11 Orthophosphate (ppm |
|---|---|---|
| 0 | 4.33 | 4.33 |
| 1 | 2.00 | 4.09 |
| 2 | 1.95 | 3.76 |
| 4 | 1.95 | 3.71 |

The results show that lanthanum chloride is more effective at removing orthophosphate from solution than is lanthanum carbonate.

Examples 12–15

Samples of water were taken from residential swimming pools and analyzed for total phosphorus content. Analysis was performed by ICP spectroscopy. Various quantities of material made according to Example 1 were placed in a mesh bag, which was placed in the skimmer of each pool (before the filter). The circulation systems of the pools were run 10–12 hours per day, and the water checked daily for signs of turbidity. After 21 days, a water sample from each pool was tested for total phosphorus content. The results are given in Table 4.

TABLE 4

| Ex. | Pool size (gal.) | Material Used (g) | Phosphorus Before (as ppm PO$_4$) | Phosphorus After (as ppm PO$_4$) | Phosphorus Removal Capacity (g PO$_4$/g product) | Turbidity |
|---|---|---|---|---|---|---|
| 12 | 12000 | 224 | 20.6 | 17.9 | 0.55 | None |
| 13 | 20000 | 168 | 5.86 | 4.18 | 0.76 | None |
| 14 | 12000 | 168 | 0.218 | 0.045 | 0.05 | None |
| 15 | 20000 | 168 | 0.375 | 0.121 | 0.11 | None |

Comparative Examples 1–3

These experiments show the efficacy of lanthanum carbonate-based products that have recently become commercially available. The efficacy of these products was evaluated in low chloride ion concentration water (about 175 ppm) simulating fresh water pool water, and in high chloride ion concentration water (about 5000 ppm) simulating salt water pool water.

A stock solution of balanced pool water was prepared with 100 ppm calcium as calcium chloride, 100 ppm bicarbonate, and a pH of 7.47. This gives a solution of approximately 175 ppm chloride ion. To this solution was added approximately 15 ppm of orthophosphate as monobasic sodium phosphate. This solution was then divided into three equal volumes of 500 mL, which were placed into plastic bottles. The treatment of each bottle is described below in Table 5. The bottles were capped and mixed by an orbital mixer for 24 hours. Samples from each bottle were filtered and analyzed for phosphorus using ICP spectroscopy. The results are shown below in Table 5. The untreated sample served as an orthophosphate control sample.

TABLE 5

| Comp. Ex. | Treatment | Phosphorus Before (as mg/L $PO_4$) | Phosphorus After (as mg/L $PO_4$) | Phosphorus Removed (as mg $PO_4$) | Phosphorus Removal Capacity (g $PO_4$/g added product) |
|---|---|---|---|---|---|
| 1 | — | 16.3 | 16.3 | 0 | — |
| 2 | 121.7 mg $La_2(CO_3)_3$ solution | 16.3 | 16.0 | 0.15 | 0.00123 |
| 3 | 4.1 g NaCl and 129.3 mg $La_2(CO_3)_3$ solution | 16.3 | 15.0 | 0.65 | 0.00503 |

The results obtained show that the lanthanum carbonate product is significantly more effective at orthophosphate removal in a system having a high chloride ion concentration than it is in a system having a low chloride ion concentration. However, even at high chloride ion concentrations, lanthanum carbonate is relatively ineffective compared to the composition of the present invention, as can be seen by comparing the results obtained above with those presented regarding lanthanide halides.

The present invention having been thus described, it will be understood that variations and modifications thereto can be made without departing from the spirit and scope of the invention. These variations are intended to be within the scope of the appended claims, or of equivalents thereto.

What is claimed is:

1. A water treatment composition, comprising:
   (a) a water soluble lanthanide halide salt;
   (b) a polymer selected from the group consisting of poly(acrylamide-co-acrylic acid), chitosan, polyacrylamide, poly(acrylic acid), and polyvinyl alcohol having a molecular weight of at least around 15,000,000; and
   (c) a binder.

2. The composition of claim 1 wherein said polymer is selected from the group consisting of poly(acrylamide-co-acrylic acid), polyacrylamide, poly(acrylic acid), and polyvinyl alcohol.

3. The composition of claim 2, wherein the lanthanide halide salt is a lanthanide chloride.

4. The composition of claim 3, wherein the lanthanide chloride is lanthanum chloride.

5. The composition of claim 3, wherein the lanthanide chloride is a mixture of two or more chloride salts of lanthanide cations having an atomic number between 57 and 71.

6. The composition of claim 5, wherein the lanthanide chloride is a mixture of two or more of chloride salts of lanthanum, neodymium, cerium, and praseodymium.

7. The composition of claim 6, wherein the lanthanide halide composition comprises about 40 wt % to about 70 wt % lanthanum chloride, about 10 wt % to about 30 wt % neodymium chloride, about 0 wt % to about 30 wt % cerium chloride, and about 0 wt % to about 30 wt % praseodymium chloride.

8. The composition of claim 2, having a ratio of high molecular weight polymer to lanthanide ion in the range of 0.2:1 to 1:1.

9. The composition of claim 2, wherein the binder is selected from the group consisting of diatomaceous earth, zeolite, alumina, silica, and silicates.

10. The composition of claim 9, wherein the binder is diatomaceous earth.

11. The composition of claim 2, which is in the form of a monolithic solid.

12. The composition of claim 2, which is in the form of an aqueous slurry or paste.

13. The composition of claim 2, which is in the form of dry, pressed pellets.

14. The composition of claim 2, which is in the form of a powder.

15. The composition of claim 2, wherein the lanthanide halide salt is present in an amount ranging from about 50 wt % to about 80 wt %, based upon the total solids in the composition.

16. The composition of claim 2, wherein the high molecular weight polymer is present in an amount ranging from about 8 wt % to about 20 wt %, based upon the total solids in the composition.

17. The composition of claim 2, wherein the binder is present in an amount ranging from about 20 wt % to about 40 wt %, based upon the total solids in the composition.

18. The composition of claim 2, comprising:
   (a) 50 wt % to 60 wt % lanthanum chloride, calculated as $LaCl_3 \cdot 6H_2O$;
   (b) 11 wt % to 15 wt % poly(acrylamide-co-acrylic acid); and
   (c) 30 wt % to 35 wt % diatomaceous earth;
   based on the total solids in the composition.

19. The composition of claim 18, comprising:
   (a) about 55 wt % lanthanum chloride, calculated as $LaCl_3 \cdot 6H_2O$;
   (b) about 13 wt % poly(acrylamide-co-acrylic acid); and
   (c) about 32 wt % diatomaceous earth;
   based on the total solids in the composition.

20. The composition of claim 2, wherein the high molecular weight polymer is poly(acrylamide-co-acrylic acid).

21. A water treatment composition, comprising:
   (a) a water soluble lanthanide halide salt;
   (b) a poly(acrylamide-co-acrylic acid) polymer having a molecular weight of at least around 15,000,000; and
   (c) a binder.

22. A method for reducing the concentration of phosphates in water, comprising:
   contacting the water with an effective amount of a composition comprising:
   (a) a water soluble lanthanide halide salt in sufficient quantity to precipitate phosphate compounds from water;
   (b) a polymer selected from the group consisting of poly(acrylamide-co-acrylic acid), chitosan, polyacrylamide, poly(acrylic acid), and polyvinyl alcohol having a molecular weight of at least around 15,000,000; and
   (c) a binder.

23. The method of claim 22 wherein said polymer is selected from the group consisting of poly(acrylamide-co-acrylic acid), polyacrylamide, poly(acrylic acid), and polyvinyl alcohol.

24. The method of claim 23, further comprising filtering the water.

25. The method of claim 24, wherein the filtering occurs prior to the mixing.

26. The method of claim 24, wherein the filtering occurs after the mixing.

27. The method of claim 24, wherein the contacting comprises circulating water through a flow-through vessel in a water filtration line.

28. The method of claim 23, wherein the contacting comprises mixing the composition in the form of a slurry or paste, pellets, or powder with the water, and further comprising filtering the water.

29. The method of claim 23, wherein the contacting comprises floating the composition in the water.

30. The method of claim 29, wherein the composition is disposed within a float that allows water to flow in and out, thereby coming into contact with the composition.

31. The method of claim 23, wherein the lanthanide halide dissolves and forms a precipitate of lanthanum phosphates, and wherein the high molecular weight polymer flocculates the lanthanum phosphates into filterable flocs.

32. The method of claim 23, wherein the water is recirculated water in a pool, hot tub, spa, or cooling apparatus.

33. A method for reducing the concentration of phosphates in water, comprising:

contacting the water with an effective amount of a composition comprising:
- (a) a water soluble lanthanide halide salt in sufficient quantity to precipitate phosphate compounds from water;
- (b) a poly(acrylamide-co-acrylic acid) polymer having a molecular weight of at least around 15,000,000; and
- (c) a binder.

* * * * *